(12) United States Patent
Hoff et al.

(10) Patent No.: US 9,097,344 B2
(45) Date of Patent: Aug. 4, 2015

(54) AUTOMATIC SHIFT CONTROL SYSTEM FOR A POWERTRAIN AND METHOD

(71) Applicant: Caterpillar Inc., Peoria, IL (US)

(72) Inventors: Brian Hoff, East Peoria, IL (US); Sri Vidya Kamisetty, Aurora, IL (US); Chad Brickner, Aurora, IL (US); Aaron Shatters, Montgomery, IL (US); Wayne Harshberger, Oswego, IL (US); Mark Rettig, East Peoria, IL (US); Kevin Moloney, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 13/658,494

(22) Filed: Oct. 23, 2012

(65) Prior Publication Data
US 2014/0095036 A1   Apr. 3, 2014

Related U.S. Application Data

(60) Provisional application No. 61/707,531, filed on Sep. 28, 2012.

(51) Int. Cl.
*F16H 61/04* (2006.01)
*F16H 61/68* (2006.01)

(52) U.S. Cl.
CPC ..................................... *F16H 61/68* (2013.01)

(58) Field of Classification Search
None
See application file for complete search history.

(56) References Cited

U.S. PATENT DOCUMENTS

| | | | | |
|---|---|---|---|---|
| 3,643,828 A | * | 2/1972 | Elliott | 414/699 |
| 5,875,701 A | | 3/1999 | Cobo et al. | |
| 5,974,352 A | | 10/1999 | Shull | |
| 6,064,933 A | * | 5/2000 | Rocke | 701/50 |
| 6,234,254 B1 | * | 5/2001 | Dietz et al. | 172/3 |
| 6,553,302 B2 | | 4/2003 | Goodnight et al. | |
| 6,879,899 B2 | * | 4/2005 | Budde | 701/50 |
| 6,901,324 B2 | | 5/2005 | Rose et al. | |
| 7,935,302 B1 | * | 5/2011 | Groteke | 266/205 |
| 8,082,082 B2 | | 12/2011 | Matsuyama | |
| 8,121,763 B2 | | 2/2012 | Hou | |
| 8,554,423 B2 | * | 10/2013 | Tanaka et al. | 701/50 |
| 2002/0043374 A1 | * | 4/2002 | Luca et al. | 172/4 |
| 2004/0158355 A1 | * | 8/2004 | Holmqvist et al. | 700/245 |
| 2010/0235066 A1 | * | 9/2010 | Hill | 701/102 |
| 2012/0179341 A1 | * | 7/2012 | Hou | 701/54 |
| 2012/0310493 A1 | * | 12/2012 | Fukuhara et al. | 701/50 |

FOREIGN PATENT DOCUMENTS

| | | |
|---|---|---|
| JP | 2005098076 | 4/2005 |
| JP | 2005146738 | 6/2005 |

* cited by examiner

*Primary Examiner* — John R Olszewski
*Assistant Examiner* — Jess Whittington

(57) ABSTRACT

A machine powertrain having a transmission includes a control device responsive to selectively vary the transmission ratio in response to a shift signal. A lift sensor associated with a machine implement monitors an implement position and provides a lift signal. A ground speed sensor monitors the ground speed and provides a ground speed signal. A controller monitors the lift and ground speed signals, compares the lift signal to a predetermined position range, compares the ground speed signal to a predetermined ground speed range and, when the ground speed signal is within the predetermined ground speed range and the lift signal is within the predetermined position range, provides the shift signal causing the selectively variable ratio of the transmission to change.

20 Claims, 6 Drawing Sheets

AUTOMATIC SHIFT CONTROL SYSTEM FOR A POWERTRAIN AND METHOD

CROSS-REFERENCE TO RELATED APPLICATION

This patent application is a nonprovisional of U.S. Provisional Patent Application No. 61/707,531, filed Aug. 28, 2012, which application is hereby incorporated by reference herein.

TECHNICAL FIELD

This patent disclosure relates generally to machines and, more particularly, to a transmission control for an earthmoving machine.

BACKGROUND

Certain machine applications, such as loaders performing load carrying functions, present unique challenges during operation that can have an effect on machine operating efficiency. For example, a wheel loader that encounters a pile will typically require the operator to downshift the transmission of the loader, unlock the lock-up clutch (LUC) of a torque converter if one is present, and/or otherwise prepare the drivetrain or powertrain of the machine in an appropriate fashion before the pile is encountered so as to ensure that sufficient torque will be available to push the bucket into the pile without causing engine underspeed, engine hesitation, excessive transmission load, and/or other powertrain effects.

At present, experienced operators are expected to know to downshift the machine or take other action under such operating conditions. However, relatively inexperienced or inattentive operators may often fail to take action under these or similar operating conditions, such as downshifting the machine, which can cause long-term increases in machine component wear and reduced operating machine efficiency, especially with regard to fuel economy. Thus, operator training, experience and attentiveness are currently relied upon to improve the operating efficiency of machines.

DETAILED DESCRIPTION

The present disclosure relates to powertrains and, specifically, to a transmission control system for work machines that can encounter loads during service. The particular embodiment described relates to a wheel loader having a continuously variable transmission, but it should be appreciated that the systems and methods described herein are equally applicable to other types of machines having different types of transmissions. The disclosure includes functionality that anticipates a load increase based on various machine operating parameters, including various functional positions of a work implement of the machine. Based on this determination, the control system, when active, is configured to automatically take action to adjust a speed ratio of a transmission of the machine in anticipation of a load change before the load change is realized. In this way, machine components can be protected from excessive and repeated loading with reduced input from the machine operator.

Figure 1:
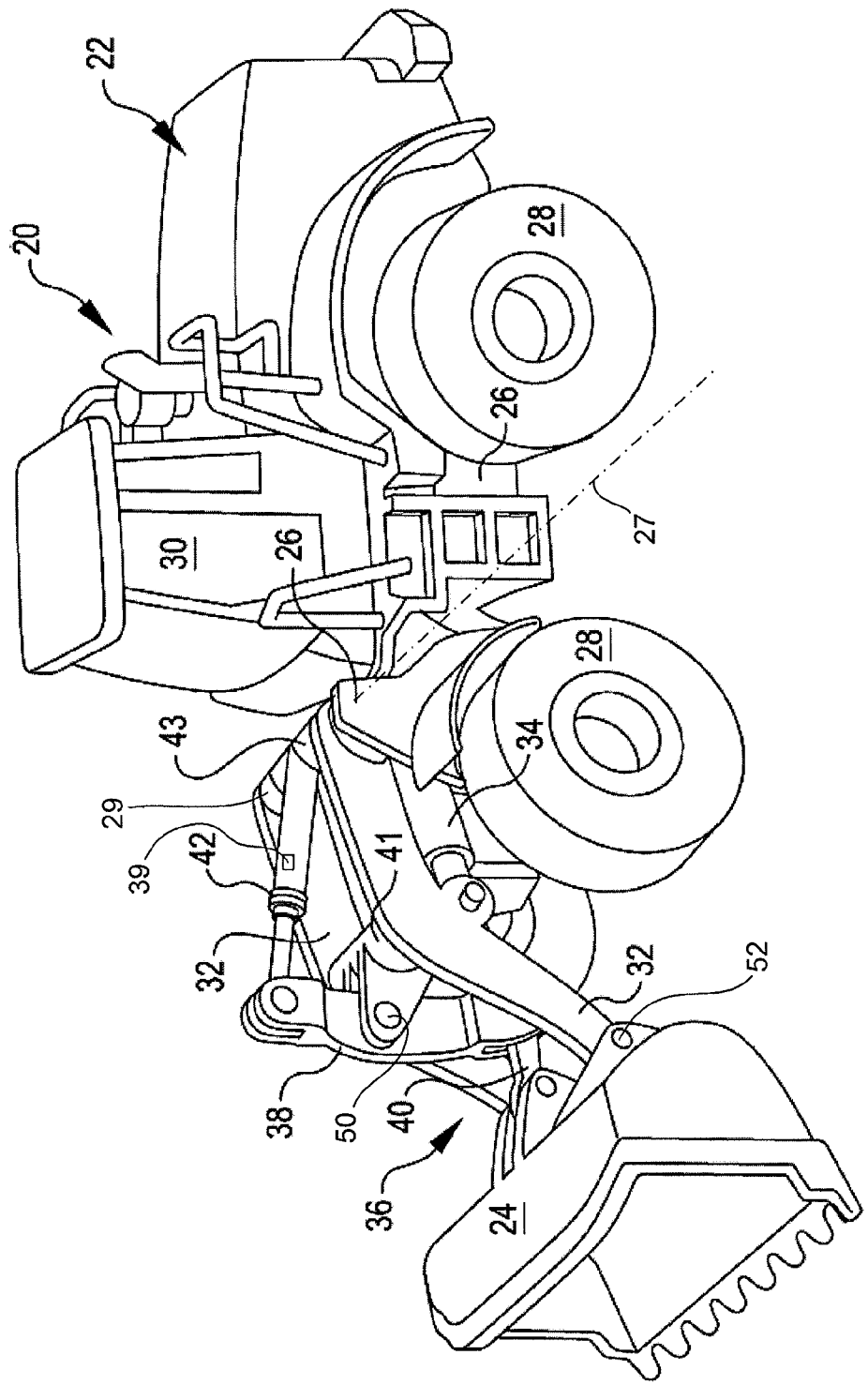
FIG. 1 is an outline view of a machine in accordance with one embodiment of the disclosure.

Referring now to the drawings, in which like reference numerals represent like parts throughout the several views, FIG. 1 shows a loader 20 in accordance with an embodiment. The loader 20 includes a vehicle portion 22 connected to a bucket or implement 24 on a front side of the vehicle portion 22. The vehicle portion 22 includes a chassis 26, which is embodied here as a frame for the vehicle portion 22 that is typically formed from steel or other metal. The chassis 26 supports various parts of the loader 20, either directly or indirectly, such as an engine, body panels, hydraulic systems, and other parts. The chassis 26 itself is supported by a plurality of wheels 28 that are rotatably connected to the chassis 26. An operator occupies a cab 30, which is part of the vehicle portion 22 and is attached to an upper middle section of the chassis 26. As shown, the cab 30 is an enclosed structure that houses the operator of the loader 20 during operation. The various operator controls of the machine, which are not shown for simplicity, can include various pedals, levers, switches, sticks, and/or any other types of devices that the operator can use to control the motion of the machine and implements.

In the illustrated embodiment, the loader 20 has a bucket implement 24 located at a front portion thereof. The bucket 24 is made from metal and comprises two parabolic or similarly-shaped plates having a metal plate curved about the perimeter of each plate and extending horizontally between them so as to form a concave enclosure opening away from the loader 20. In general, the bucket may have any shape capable of holding a payload.

As shown, the bucket 24 is attached to the vehicle portion 22 by a linkage comprising a pair of parallel arms 32 extending between a back portion of the bucket 24 to another location on the chassis 26, such as at a location immediately in front of the cab 30. The arms 32 are arranged to pivot in unison relative to the chassis 26 about an arm pivot axis 27, which coincides with pins (not visible) that pivotally interconnect the chassis 26 with the respective ends of the arms 32. Each arm 32 is an elongate metallic structure pivotally attached to the chassis 26 at one end, and pivotally attached to a rear portion of the bucket 24 at an opposite end. For each arm 32, a hydraulic lift cylinder assembly 34 or other actuator for lifting the arm 32 is pivotally attached to the chassis 26 beneath the arm 32 at a location of the arm 32 between the bucket 24 and the location of the attachment of the arm 32 to the chassis 26.

In an embodiment, the lift cylinder assembly 34 is an actuator—such as a hydraulic cylinder including a rod enclosed by a casing such that the rod extends or retracts relative to the casing—able to increase and decrease its length, thereby causing its respective arm 32 to pivot upwardly about its respective attachment to the chassis 26, or retracting its length thereby forcing the arm 32 to rotate downwardly about its attachment to the chassis 26. As the arms 32 rotate about their respective attachments to the chassis 26, the bucket 24 is raised and lowered accordingly. In general, any actuator or other mechanism capable of lifting the arms 32 may be used as an alternative to or in addition to the lift cylinder assemblies 34. An arm lift sensor 29 is disposed to measure and provide an arm lift signal indicative of the inclination of the arms 32 relative to the chassis 26. Alternatively, the arm lift signal may be generated by a displacement sensor associated with one or both lift cylinder assemblies 34. In such embodiment, the lift of the arms 32 can be correlated to an elongation of the lift cylinders. The arm lift signal is provided to a controller 232 (FIG. 2).

In an embodiment, the bucket 24 is additionally connected to the arms 32 by a tilt linkage 36 that controls the angular position of the bucket 24 relative to the arms 32. In an embodiment, the tilt linkage 36 includes a major tilt arm 38 and a minor tilt arm 40. The major tilt arm 38 is an elongate metallic structure rotatably connected at its middle portion to a first cross member 41 extending horizontally between corresponding middle portions of the arms 32. In an embodiment, a hydraulic tilt cylinder assembly 42 or other actuator for actuating the angular position of the bucket 24 relative to the arms 32 rotatably connects an upper end of the major tilt arm 38 to a second cross member 43 extending between the arms 32 near their connections to the chassis 26. Like the lift cylinder assembly 34, the tilt cylinder assembly 42 is embodied in FIG. 1 as a linear, hydraulic actuator able to increase and decrease its length, thereby rotating the major tilt arm 38 about its connection to the first cross member 41.

The end of the major tilt arm 38 opposite the tilt cylinder assembly 42 is connected to the bucket 24 by the minor tilt arm 40, which is an elongate piece of metal extending and rotatably connected to a rear portion of the bucket 24 above the connections of the bucket 24 to the arms 32. In an embodiment, the tilt cylinder assembly 42 can extend its length, thereby, through the tilt linkage 36, causing the bucket 24 to curl with a lower front edge of the bucket 24 rotating upwardly. Similarly, the tilt cylinder assembly 42 can retract its length, thereby, through the tilt linkage 36, causing the bucket 24 to tilt with the lower front edge of the bucket 24 rotating downwardly. A sensor 39 is disposed to measure an angular position of the bucket 24 relative to the arms 32, and to provide a bucket tilt signal to a controller 232 (FIG. 2). The sensor 39, although shown associated with the tilt cylinder assembly 42, may alternatively be a rotational encoder or other type of sensor associated with any of pin joints that participate in tilting the bucket 24, for example, a main tilt arm pivot pin 50, a bucket pivot pin 52, and/or other appropriate measurement locations.

Figure 2:
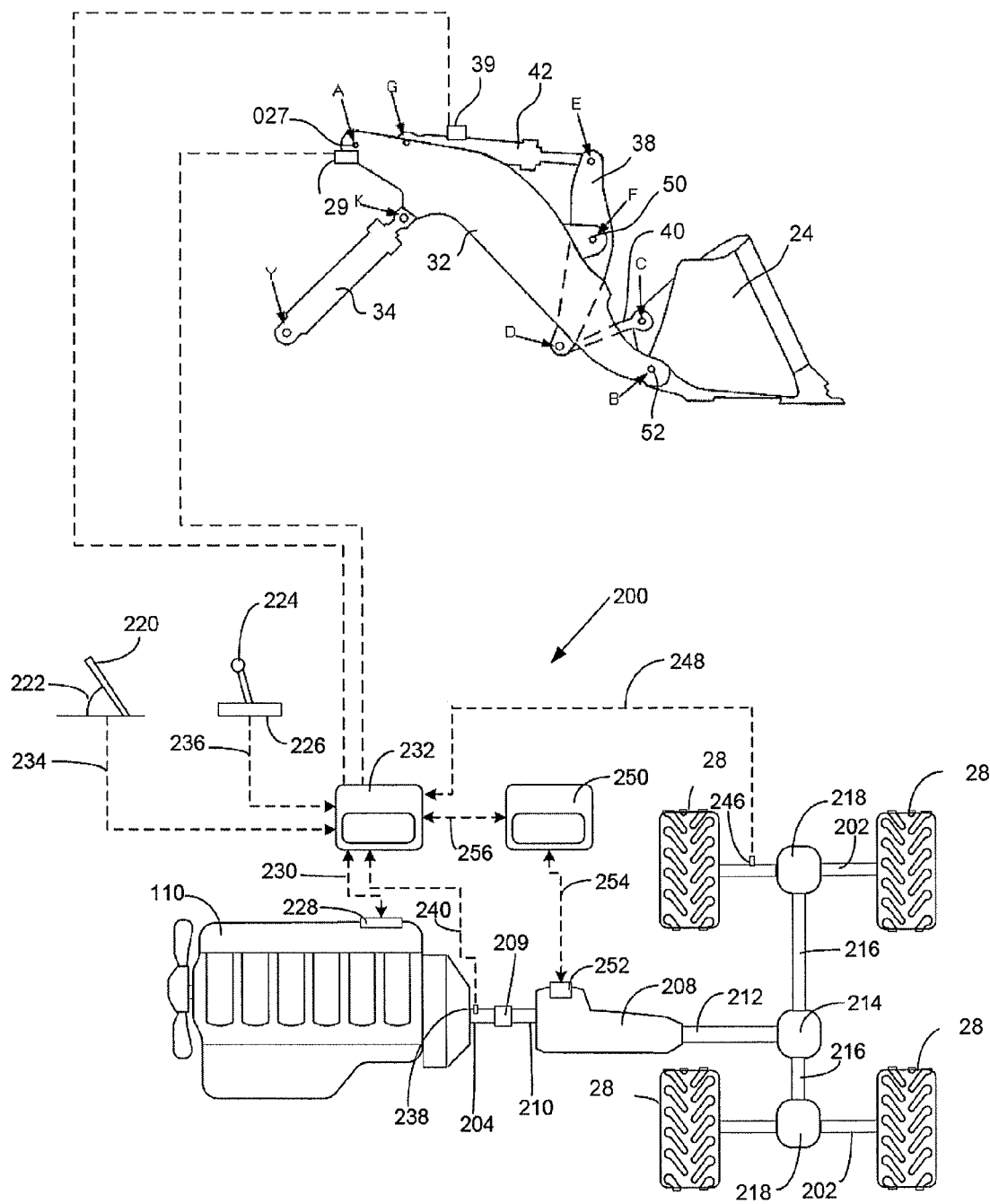
FIG. 2 is a block diagram of a machine system in accordance with the disclosure.

FIG. 2 is a schematic of a powertrain and implement system 200 of the loader 20. As previously described, the loader 20 includes an articulated chassis 26 having two axles 202 (FIG. 2) connected to ground engaging members, in this case, a set of wheels 28. The chassis 26 also supports an engine 110, which has an output shaft 204 connected to a transmission 208 via a connecting shaft 210 and a coupling 209. An output shaft 212 of the transmission 208 is connected to a splitter 214 that powers two drive shafts 216, one for each axle 202. The transmission 208 is configured to selectively transform an engine speed and torque provided from the engine 110 at the connecting shaft 210 to a variable speed and torque at the output shaft 212, which is then applied to drive the ground engaging members or wheels 28.

The transmission 208 may be embodied as any type of known transmission such as a continuously variable transmission that includes a variator, as is known in the art, a hydrostatic transmission having a variable displacement pump operating to provide fluid to a variable or fixed displacement motor, a geared transmission having a torque converter with or without a lock clutch (LUC) capability, and so forth. Each drive shaft 216 transmits power to the wheels 28 via a respective differential 218 such that rotational power provided at the engine output shaft 204 is effectively transmitted to the wheels 28. Although two driven axles 202 are shown, a single axle or more than two axles may be used depending on the type of vehicle. Moreover, although wheels are shown, other types of ground engaging members, such as tracks, may be used.

The operator cab 30 houses various machine control devices, as previously described. As shown in FIG. 2, such devices can include an accelerator pedal 220 having an accelerator pedal sensor (APS) 222, and a gear selector lever 224 having a lever encoder 226. The APS 222 and lever encoder 226 may be configured to provide signals indicative of the desired ground speed of the loader 20 that is commanded by an operator during use.

The engine 110 has an interface 228 that is connected to a communication channel 230 with an engine controller 232. The engine controller 232 operates to monitor and control the function of various engine systems, such as monitor sensor readings from various engine sensors, control engine speed and load output and so forth, by receiving information and transmitting commands to various engine components through the communication channel 230. As shown, the engine controller 232, or another controller connected to the controller 232, is further connected to various vehicle components that can control the operation of the engine. Here, the controller 232 may also operate as an implement controller such that it receives the arm lift signal from the arm lift sensor 29, and the bucket tilt signal from the bucket tilt sensor 39, as shown.

The controller or governor 232 is an electronic controller that includes a processor operably associated with other electronic components such as a data storage device and the various communication channels. In the illustration of FIG. 2, a throttle communication channel 234 and a gear selection encoder communication channel 236 are connected to the controller 232 and configured to provide to the controller 232 information indicative of the operator's commands, such as the desired engine speed or load, the desired forward or reverse travel direction of the machine, a "neutral" or "park" setting of the machine transmission, and the like. A further indication by the operator such as an upshift, downshift, clutch lock, clutch unlock and other signals, as appropriate for the type of transmission used, can be provided. It should be appreciated that additional or alternative connections between the controller 232 and the various engine and/or vehicle systems may be present but are not shown for simplicity.

The controller 232 is further configured to receive information indicative of the operation of the remaining portion of the powertrain and implement system 200. In this way, the controller 232 is connected to an engine output shaft speed sensor 238 via an engine speed communication channel 240, to a vehicle ground speed sensor 246 via a ground speed communication channel 248, and to other sensors, which are not shown for simplicity.

The powertrain and implement system 200 further includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250 and/or the controller 232, as well as provide information to the transmission controller 250 indicative of the current gear engagement state of the transmission 208, and other information, such as the power transmitted to the wheels 28 through the transmission 208, the speed of the output shaft 212, the speed of the connecting shaft 210, and the like. During operation, the transmission controller 250 may command gear changes to the transmission 208 based on predetermined connecting shaft speed thresholds for up-shift and downshift changes.

Such gear changes may include command signals provided to the variator for adjusting the relative speeds of incoming and outgoing gears, operating in a spinning idle state, where no engine rotation is transferred through the transmission, and other operating conditions. In some conditions, the variator may be commanded to assume a position in which a torque at the output shaft is maintained while the engine shaft is essentially de-coupled from the output shaft of the transmission. This type of torque "holding" position can be commanded when, for example, a wheel loader has sufficiently pushed itself against an aggregate pile and the operator wishes to hold that position while the bucket is loaded. As can be appreciated, the holding torque in such instance is required to prevent the machine rolling away from the pile.

In one embodiment, a downshift command to the transmission 208 or, alternatively, a command to unlock a lock-up clutch (LUC) of a torque converter (not shown) associated with the transmission in the known fashion, can be generated by the machine controller 232 and provided to the transmission controller 250 automatically when the system 200 predicts that a pile hit is imminent. In this way, the transmission 208 can downshift or, alternatively, a torque converter may be unlocked, before the pile hit occurs. Relative to the present disclosure, such automatic signal can be provided on the basis of various enabling parameters during operation of the machine. One such embodiment relates to the sensed arm lift and bucket tilt signals. The various pivot points of the implement system are marked as A-G, Y and K in FIG. 2, and any of those can appropriately be used to provide various signals indicative of the position and orientation of the bucket 24 relative to the arms 32 and the chassis 26 (FIG. 1) of the loader 20.

Figure 3:
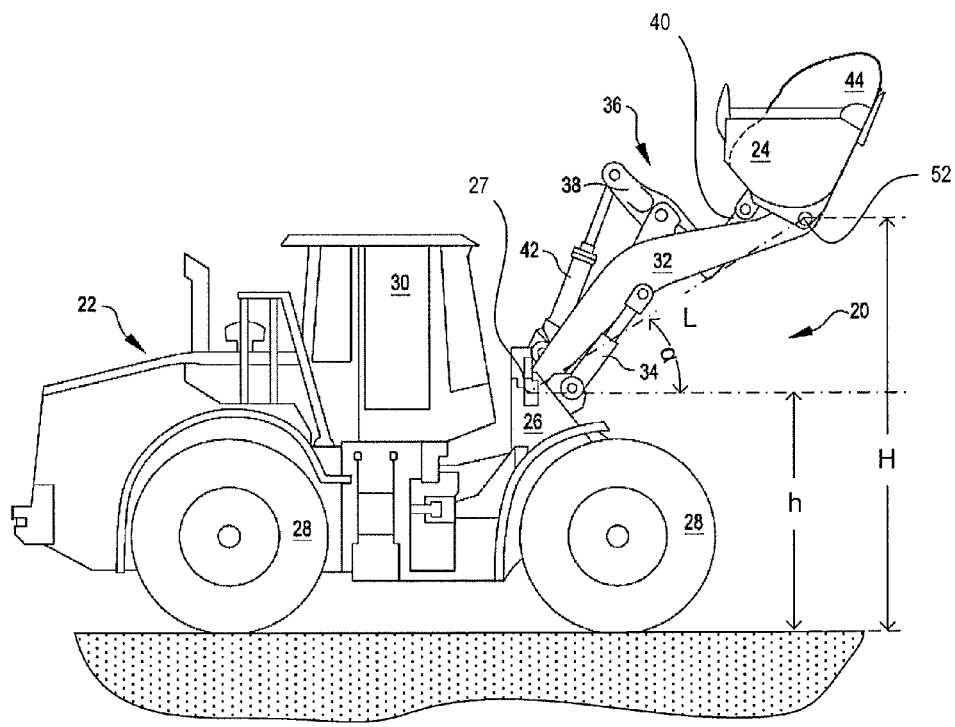
FIGS. 3 and 4 are outline views of a machine having a work implement in two operating positions in accordance with the disclosure.
Figure 4:
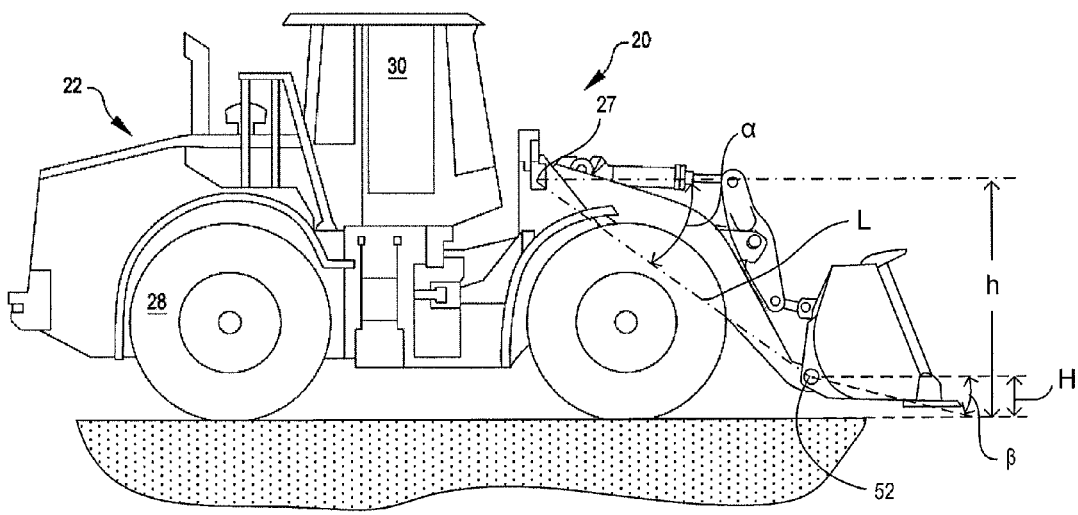

More specifically, the system 200 may be configured to generate an automatic downshift command when a pile dig condition is detected to be present or imminent, as shown in FIG. 4, or a dump condition, that is, the truck loading operation where the contents of the bucket are emptied at a relatively high elevation relative to the ground, is detected to be present or imminent, as shown in FIG. 3. To promote stable and predictable machine operation, these enabling conditions are coupled with machine ground speed such that the automatic shifting can only occur when machine speed is below an enabling threshold. In one embodiment, further system checks can be performed to enable the automatic downshift function in the absence of any detected machine fault conditions, for example, in the arm lift position and/or bucket tilt position sensors.

In reference now to FIGS. 3 and 4, two automatic shift enabling operating positions of the loader 20 are shown. In FIG. 3, a dump operation is illustrated. Here, the bucket 24 is carrying a payload 44. The bucket is in a curled position to contain the payload 44 as the loader 20 approaches a dump location, for example, alongside a truck bed (not shown). When the loader 20 dumps the payload 44, the operator may drive the loader to position the bucket 24 above the dump location (not shown). To unload the payload, the operator may command the tilt actuator 42 to retract, which will cause the major tilt arm 38 to pivot and push the minor tilt arm 40 to push the bucket 24 in an uncurling direction (clockwise, as shown in FIG. 3) such that the payload 44 may pour therefrom by the force of gravity.

Rotation of the bucket 24 relative to the arms 32 occurs about the bucket pivot pin 52. A height, H, of the bucket pivot pin 52 relative to the ground can be deduced from the lift angle, α, of the arms 32 relative to the chassis according to the following equation:

$$H = h + L^* \sin(\alpha)$$

where, as shown in FIG. 3, H is the height of the bucket pivot pin 52 from the ground, h is the fixed height of the arm pivot axis 27 from the ground, L is the radial distance of the bucket pivot pins with respect to the pivot axis 27 of the arms 32, and α is the upward inclination angle of the arms with respect to the ground. As can be appreciated, the ground here refers to the surface onto which the wheels 28 of the loader 20 are riding, which may or may not be a horizontal surface.

A pile dig position is shown in FIG. 4. Here, because the bucket pivot pin 52 is below the height, h, of the arm pivot axis 27, the height of the bucket pivot pin 52 relative to the ground can be determined by the following equation:

$$H = h - L^* \sin(\alpha)$$

where, as shown in FIG. 4, α is the angle of the arms 32 relative to the ground. Also shown in FIG. 4 is a curl angle, β, of the bucket 24 relative to the arms 32, where 0 degrees represents a bucket position when the tilt actuator 42 is in position to maintain a bottom surface of the bucket substantially parallel to the ground.

Figure 5:
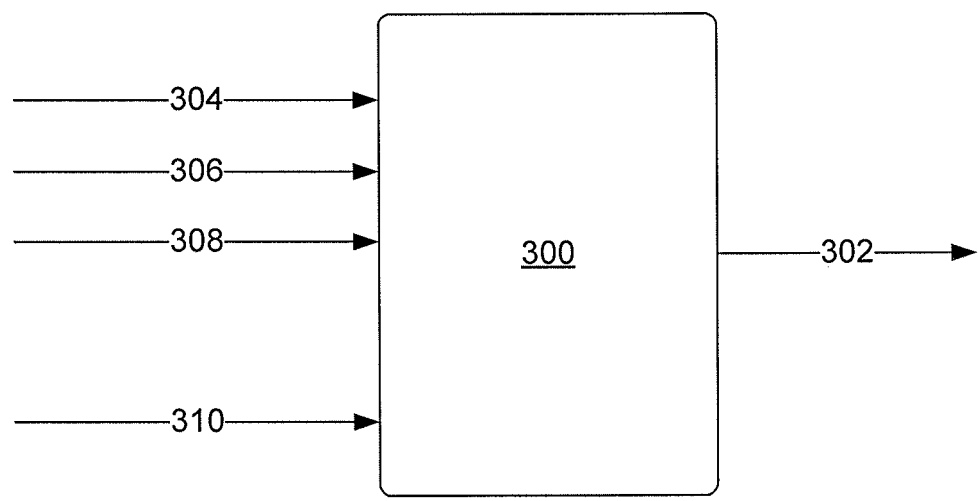
FIG. 5 is a block diagram for a machine control system in accordance with the disclosure.

Based on the height, H, of the bucket pivot pin 52, the tilt angle, β, of the bucket 24, and the ground speed of the loader 20, the controller 232 may provide a downshift/unlock signal 302, in accordance with an auxiliary shift control scheme 300, as shown in FIG. 5. More specifically, the control scheme 300 is a function that may operate within a machine controller, for example, the controller 232. The control scheme 300 may be implemented as software operating within an electronic controller, as hardware, or in any other suitable fashion. The control scheme 300 can receive various machine operating parameter inputs including a bucket lift signal 304, a bucket tilt signal 306, a machine ground speed signal 308 and, optionally, a fault detection signal 310.

In the illustrated embodiment, the bucket lift signal 304 may be a calculated or measured parameter indicative of the height of the bucket pivot pins 52 with respect to the surface onto which the loader is riding, which height is denoted by "H" in FIGS. 3 and 4. One possible signal that can be used as a basis to calculate the height, H, can be a lift signal provided by the lift sensor 29 that is associated with the pivot axis 27 of the arms 32 relative to the chassis 26, as shown in FIGS. 1 and 2.

The bucket tilt signal 306 may be a calculated or measured parameter indicative of the tilt angle, β, of the bucket 24 relative to the arms 32, as shown in FIG. 4. One possible signal that can be used as a basis to calculate the angle, β, can be a tilt signal provided by the tilt sensor 39 that is associated with the tilt actuator 42, as shown in FIG. 2.

The machine ground speed signal 308 may be a signal indicative of the ground travel speed of the loader 20. One possible signal that can be used as a basis to calculate the machine travel speed can be a signal provided by the vehicle ground speed sensor 246, as shown in FIG. 2. The fault signal 310 may be a signal provided by a failure diagnostic routine (not shown) operating within the controller and monitoring the various signals provided by the various sensors of the machine. As is known, such diagnostic routines may monitor sensor signals and supply voltages to ensure that they are all within respective acceptable parameters. In the event a fault is detected, for example, a short to high or to ground in any sensor, a fault signal corresponding to the faulty sensor may be activated to communicate the failure to the various modules within the system such that failure mitigation steps can be taken. Here, the control scheme 300 may revert to normal transmission shifting and/or LUC unlocking in the event the fault signal 310 indicates a failure in the sensors relevant to the operation of the control scheme 300.

Figure 6:
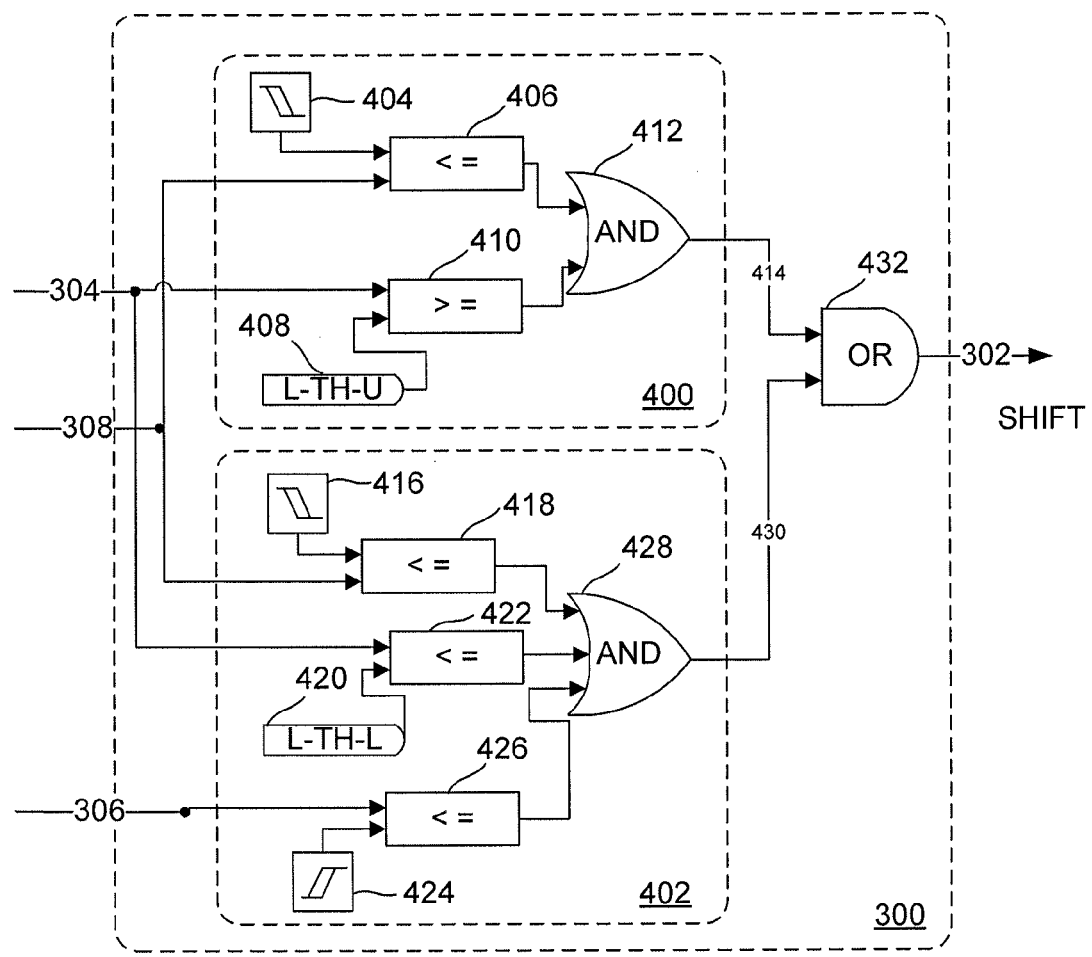
FIG. 6 is a block diagram for a control scheme in accordance with the disclosure.

A schematic diagram illustrating one particular implementation for the control scheme 300 is shown in FIG. 6. Here, the illustrated functionality is separated into two main functions, a load dump condition 400 and a pile dig condition 402 that correspond, respectively, to the type of operating conditions shown in FIGS. 3 and 4.

Relative to the load dump condition 400, the control scheme 300 receives the machine ground speed 308 and compares it to an enabling speed threshold 404 at a comparator function 406. In the illustrated embodiment, the comparator function 406 determines whether the machine ground speed 308 is less than or equal to an enabling speed threshold of between 24 and 26 kph with hysteresis, but other speeds can be used. The bucket height, H, as indicated by the bucket lift signal 304, is compared with an upper threshold value (L-TH-U) 408 at a comparator 410 to determine whether the bucket height is greater than the L-TH-U. In the illustrated embodiment, the L-TH-U is about 1200 mm, but other heights can be used. When the machine speed is less than the threshold speed, and the bucket height is higher than the threshold height, an AND gate 412 is activated to provide a load dump condition indication signal 414.

Relative to the pile dig condition 402, the control scheme 300 compares the machine ground speed 308 to an enabling speed threshold 416 at a comparator function 418. In the illustrated embodiment, the comparator function 418 determines whether the machine ground speed 308 is less than or equal to an enabling speed threshold of between 20 and 22 kph, with hysteresis, but other speeds can be used. The bucket lift signal 304 is compared with a lower threshold value (L-TH-L) 420 at a comparator 422 to determine whether the bucket height is less than the L-TH-L. In the illustrated embodiment, the L-TH-L is between about 450 and 550 mm, with hysteresis, but other heights can be used. The bucket tilt signal 306 is compared to an enabling tilt threshold 424 at a comparator function 426. In the illustrated embodiment, the comparator function 426 determines whether the bucket tilt signal 306 is less than or equal to an enabling tilt angle threshold of between 15 and 20 degrees, with hysteresis, but other angles can be used. When the machine speed is less than the threshold speed, the bucket height is lower than the threshold height, and the tilt angle is less than the tilt angle threshold, an AND gate 428 is activated to provide a pile dig condition indication signal 430.

When either the load dump condition indication signal 414 or the pile dig condition indication signal 430 is activated, an OR gate 432 is activated, which in turn activates and provides the downshift/unlock signal 302. When the downshift/unlock signal 302 is provided, depending on the particular transmission type and powertrain makeup of the machine, the signal 302 may cause the transmission may automatically downshift to the next lower gear ratio, cause a torque converter to unlock, or cause a hydrostatic transmission to assume a new, lower equivalent gear ratio, in anticipation of a torque change in the motion of the machine that will result by either stopping the machine before a payload dump, hitting a pile of material with the implement bucket, engaging the ground for digging, and other similar functions.

INDUSTRIAL APPLICABILITY

The present disclosure is applicable to any type of machine or vehicle, including on- or off-highway vehicles, that have a powertrain that includes a device capable of varying an actual or equivalent gear ratio between a prime mover, for example, an engine, and ground engaging members, for example, wheels. In one disclosed embodiment, a control system monitors various machine operating parameters, including a position of the work implement and the ground speed of the machine. Based on these parameters, the control system predicts an imminent change in torque loading of the powertrain, such as the types of loadings occurring when a loader encounters a material pile, unloads a bucket, or digs, and changes the effective gear ratio of the powertrain automatically. Changing the powertrain gear ratio can be accomplished in various fashions depending on the particular powertrain makeup of the machine. For example, a pump and/or motor setting may be changed in an hydrostatic transmission, a torque converter lock-up clutch may be disengaged, a downshift may be carried out in a geared transmission, and so forth.

Figure 7:
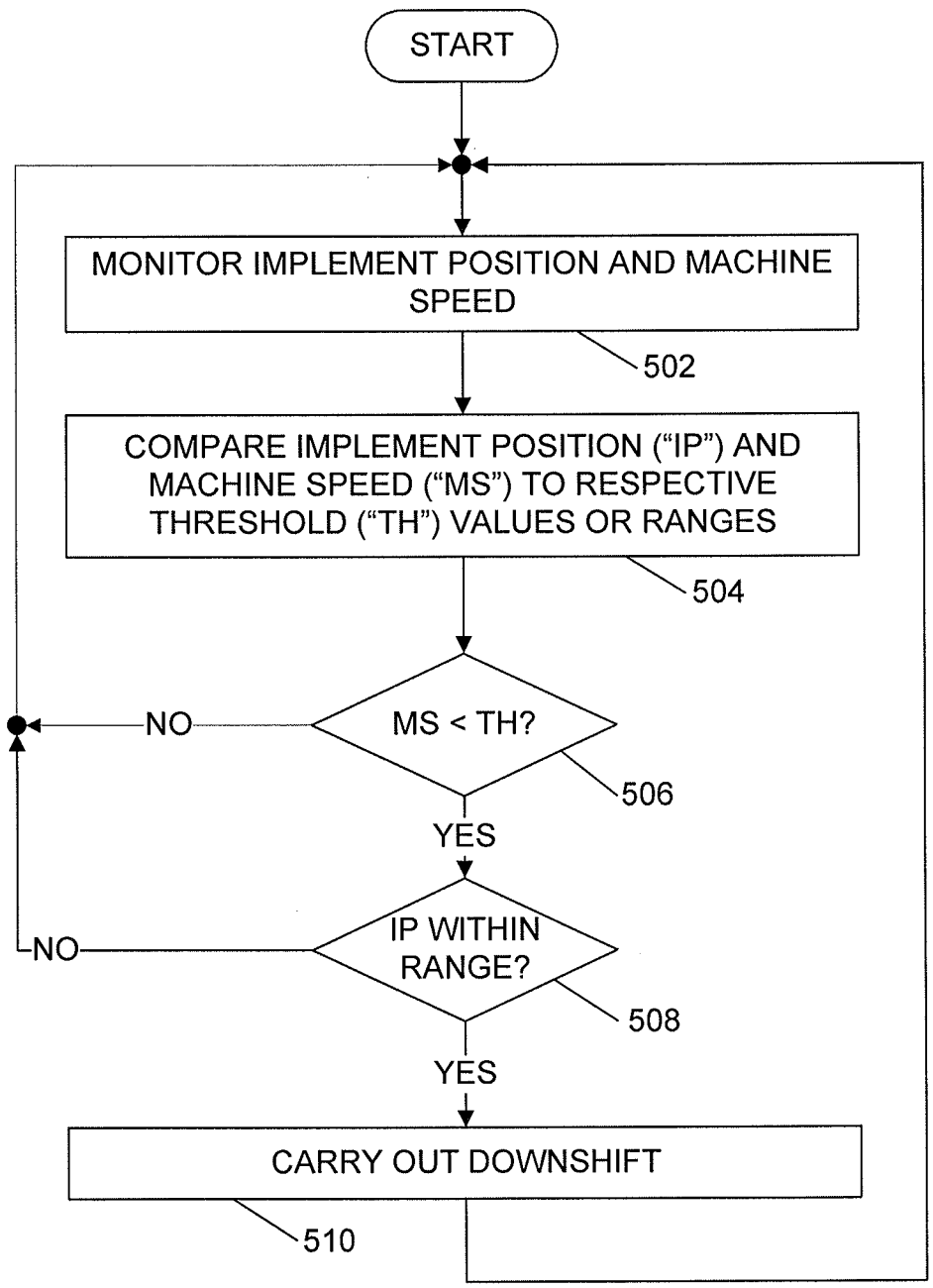
FIG. 7 is a flowchart for a method of operating a machine in accordance with the disclosure.

In one embodiment, therefore, the disclosure is directed to a method for predicting a torque change in a machine powertrain, as shown in the flowchart illustrated in FIG. 7. The method includes monitoring implement position and machine speed at 502. Implement position related parameters may be selected according to the particular implement used by the machine. For example, in a wheel loader, the height of a pin joint connecting the implement, in this case, a bucket, to the liftable arms of the machine, as well as the angular orientation of the bucket with respect to the arms may be monitored. The ground speed and implement position is each compared to a respective threshold value or range of values at 504. When the control determines that the ground speed is below a threshold value or within a range, at a determination 506, and when the implement position is within a predetermined range, at a determination 508, then a downshift command as generally described herein is carried out at 510.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine, comprising an implement being liftable at a height and tiltable at an orientation, a transmission arranged to interconnect a prime mover of the machine with ground engaging members of the machine at a selectively variable ratio such that the machine can travel along a travel surface at a ground speed, the machine comprising:
- a control device associated with the transmission and responsive to selectively vary the selectively variable ratio in response to a shift signal;
- a lift sensor associated with the implement, the lift sensor configured to monitor a parameter indicative of a position of the implement with respect to the travel surface and provide a lift signal indicative of the position;
- a ground speed sensor configured to monitor the ground speed of the machine and provide a ground speed signal indicative of the ground speed;
- a controller associated with the control device, the lift sensor, and the ground speed sensor, the controller disposed to:
  - monitor the lift signal and the ground speed signal;
  - compare the lift signal to a predetermined position range;
  - compare the ground speed signal to a predetermined ground speed range; and
  - when the ground speed signal is within the predetermined ground speed range and the lift signal is within the predetermined position range, provide a shift signal to the control device, which shift signal causes the selectively variable ratio of the transmission to change;
  - wherein the shift signal causes the transmission to provide a holding torque when the ground speed signal reduces to zero and the lift signal indicates that the position of the implement is low, which is indicative of a pile dig position; and
  - wherein the shift signal causes the transmission to downshift when the lift signal indicates that the position of the implement is high, which is indicative of a load dump position.

2. The machine of claim 1, further comprising:
- a tilt sensor associated with the implement, the tilt sensor configured to monitor a parameter indicative of an orientation of the implement with respect to the travel surface and provide a tilt signal indicative of the orientation to the controller;
- wherein the controller is further configured to:
  - monitor the tilt signal,
  - compare the tilt signal to a predetermined tilt range; and
  - provide the shift signal to the control device to change the selectively variable ratio of the transmission when the ground speed signal is within the predetermined ground speed range, the lift signal is within the predetermined position range, and the tilt signal is within the predetermined tilt range.

3. The machine of claim 2, wherein the machine is a wheel loader having a pair of arms pivotally connected to a chassis thereof, wherein the implement is a bucket pivotally connected at a free end of the pair of arms, wherein the lift sensor monitors an inclination angle of the pair of arms relative to the chassis of the wheel loader, and wherein the tilt sensor monitors an orientation of the bucket with respect to the pair of arms.

4. The machine of claim 2, wherein the predetermined position range includes a first range, which corresponds to the load dump position of the implement, and a second range, which corresponds to the pile dig position of the implement that is below the load dump position.

5. The machine of claim 1, wherein the change in the selectively variable ratio of the transmission is equivalent to a downshift gear change.

6. The machine of claim 4, wherein the first range is above a load dump position threshold, and wherein the second range is below a pile dig position threshold, the pile dig position threshold being below the load dump position threshold.

7. The machine of claim 6, wherein the predetermined tilt range is below a pile dig angle threshold.

8. A method for predicting and managing a change in torque in a machine powertrain that includes a prime mover driving ground engaging members via a transmission having a selectively variable power transmission ratio that is selectively shifted in response to commands from a controller operably associated with the transmission, the method comprising:
- monitoring at least one of a position and an orientation of a work implement of a machine with the controller;
- monitoring a ground speed of the machine with the controller;
- determining in the controller whether the at least one of the position and orientation of the work implement is within a respective predetermined range;
- determining in the controller whether the ground speed is below a threshold value; and
- when the at least one of the position and orientation of the work implement is determined to be within the respective predetermined range, and the ground speed is below the threshold value,
- issuing a controller command causing the transmission to change its operating condition;
  - wherein the controller command causes the transmission to provide a holding torque when the ground speed reduces to zero and the position and orientation of the work implement indicates that the position of the implement is low, which is indicative of a pile dig position; and
  - wherein the controller command causes the transmission to downshift when the position and orientation of the work implement indicates that the position of the implement is high, which is indicative of a load dump position.

9. The method of claim 8, wherein the machine is a wheel loader having a bucket connected at an end of a pair of lift arms, and wherein the change in torque occurs during at least one of a pile hit of the bucket with an aggregate material and a bucket payload unloading operation.

10. The method of claim 8, wherein causing the transmission to downshift includes unlocking a lockup clutch of a torque converter associated with the transmission.

11. The method of claim 8, wherein monitoring the position of the work implement includes providing a position signal from a position sensor associated with the work implement to an electronic controller.

12. The method of claim 8, wherein monitoring the orientation of the work implement includes providing an orientation signal from an orientation sensor associated with the work implement to an electronic controller.

13. The method of claim 8, wherein determining whether the position of the work implement is within a respective predetermined range includes determining a height of the work implement with respect to a travel surface of the machine and, further, determining whether the height of the machine is above the load dump position threshold height or below the pile dig position threshold height, wherein the load dump position threshold height is above the pile dig position threshold height.

14. The method of claim 13, wherein the method includes determining whether both the position and orientation of the work implement are within their respective predetermined ranges when the height of the work implement is below the lower threshold height.

15. An automatic shift control system for a powertrain of a machine, the machine having an implement being liftable at a height and tiltable at an orientation, the powertrain including a transmission arranged to interconnect a prime mover of the machine with ground engaging members of the machine at a selectively variable ratio such that the machine can travel along a travel surface at a ground speed, the automatic shift control system further comprising:
    a control device associated with the transmission and responsive to selectively vary the selectively variable ratio in response to a shift signal;
    a lift sensor associated with the implement, the lift sensor configured to monitor a parameter indicative of a position of the implement with respect to the travel surface and provide a lift signal indicative of the position;
    a ground speed sensor configured to monitor the ground speed of the machine and provide a ground speed signal indicative of the ground speed;
    a controller associated with the control device, the lift sensor, and the ground speed sensor, the controller disposed to:
        monitor the lift signal and the ground speed signal;
        compare the lift signal to a predetermined position range;
        compare the ground speed signal to a predetermined ground speed range; and
        when the ground speed signal is within the predetermined ground speed range and the lift signal is within the predetermined position range, provide a shift signal to the control device, thus causing the selectively variable ratio of the transmission to change;
    wherein the shift signal causes the transmission to provide a holding torque when the ground speed signal reduces to zero and the lift signal indicates that the position of the implement is low, which is indicative of a pile dig position; and
    wherein the shift signal causes the transmission to downshift when the lift signal indicates that the position of the implement is high, which is indicative of a load dump position.

16. The automatic shift control system of claim 15, further comprising:
    a tilt sensor associated with the implement, the tilt sensor configured to monitor a parameter indicative of an orientation of the implement with respect to the travel surface and provide a tilt signal indicative of the orientation to the controller;
    wherein the controller is further configured to:
        monitor the tilt signal,
        compare the tilt signal to a predetermined tilt range; and
        provide the shift signal to the control device to change the selectively variable ratio of the transmission when the ground speed signal is within the predetermined ground speed range, the lift signal is within the predetermined position range, and the tilt signal is within the predetermined tilt range.

17. The automatic shift control system of claim 15, wherein the machine is a wheel loader having a pair of arms pivotally connected to a chassis thereof, wherein the implement is a bucket pivotally connected at a free end of the pair of arms, wherein the lift sensor monitors an inclination angle of the pair of arms relative to the chassis of the wheel loader, and wherein the tilt sensor monitors an orientation of the bucket with respect to the pair of arms.

18. The automatic shift control system of claim 16, wherein the predetermined position range includes a first range, which corresponds to the load dump position of the implement, and a second range, which corresponds to the pile dig position of the implement that is below the load dump position.

19. The automatic shift control system of claim 15, wherein the change in the selectively variable ratio of the transmission is equivalent to a downshift gear change.

20. The automatic shift control system of claim 18, wherein the first range is above a load dump position threshold, wherein the second range is below a pile dig position threshold, wherein the load dump position threshold is above the pile dig position threshold, and wherein the predetermined tilt range is below a pile dig position angle threshold.

* * * * *